US008792404B2

(12) United States Patent
Jactat

(10) Patent No.: US 8,792,404 B2
(45) Date of Patent: Jul. 29, 2014

(54) MBMS BEARER ESTABLISHMENT RECONFIGURATION AND RELEASE

(75) Inventor: Caroline Jactat, Reading (GB)

(73) Assignee: NEC Corporation, Tokyo (JP)

( * ) Notice: Subject to any disclaimer, the term of this patent is extended or adjusted under 35 U.S.C. 154(b) by 624 days.

(21) Appl. No.: 12/747,769

(22) PCT Filed: Dec. 1, 2008

(86) PCT No.: PCT/JP2008/072209
§ 371 (c)(1),
(2), (4) Date: Jun. 11, 2010

(87) PCT Pub. No.: WO2009/075240
PCT Pub. Date: Jun. 18, 2009

(65) Prior Publication Data
US 2010/0265868 A1    Oct. 21, 2010

(30) Foreign Application Priority Data

Dec. 13, 2007   (GB) .................................. 0724315.7

(51) Int. Cl.
*H04H 20/71*           (2008.01)
(52) U.S. Cl.
USPC ......................................................... 370/312
(58) Field of Classification Search
USPC ......................................... 370/312, 334, 336
See application file for complete search history.

(56) References Cited

U.S. PATENT DOCUMENTS

| 7,039,416 B2 * | 5/2006 | Stumpert et al. ............... 455/450 |
| 2009/0129342 A1 * | 5/2009 | Hwang et al. .................. 370/331 |

FOREIGN PATENT DOCUMENTS

| CN | 101009908 A | 8/2007 |
| CN | 101039460 A | 9/2007 |
| EP | 1 694 086 A1 | 8/2006 |
| EP | 1 796 405 A1 | 6/2007 |
| GB | 2 424 797 A | 10/2006 |
| WO | 2004/043024 A1 | 5/2004 |

OTHER PUBLICATIONS

Ericsson, "Solution for Sending NAS together with RRC Connection Request", 3GPP TSG-RAN WG2#58, R2-071817, May 7-11, 2007, pp. 1-8, Kobe, Japan.
3$^{rd}$ Generation Partnership Project; Technical Specification Group Radio Access Network; Introduction of the Multimedia Broadcast Multicast Service (MBMS) in the Radio Access Network (RAN); Stage 2 (Release 7), 3GPP TS 25.346 V7.5.0., Sep. 2007, pp. 1-64.
Nokia Siemens Networks et al: "MBMS architecture for SAE/LTE", 3rd Generation Partnership Project (3GPP), Mobile Competence Centre; vol. SA WG2, No. Orlando, Jun. 19, 2007, pp. 1-10.
"Universal Mobile Telecommunications System (UMTS); Introduction of the Multimedia Broadcast/Multicast Service (MBMS) in the Radio Access Network (RAN); Stage 2," ETSI Standards, France, vol. 3-R2, No. V6.12.0; Oct. 1, 2007, pp. 1-61.

* cited by examiner

*Primary Examiner* — Mohammad Anwar
(74) *Attorney, Agent, or Firm* — Sughrue Mion, PLLC

(57) ABSTRACT

The invention provides for a method of MBMS bearer control in a mobile radio communications network by way of NAS signaling, the method including employing a NAS signal for the control of a plurality of MBMS bearers and so as to allow for bearer establishment, reconfiguration and release in a signal step.

21 Claims, 2 Drawing Sheets

MBMS BEARER ESTABLISHMENT RECONFIGURATION AND RELEASE

TECHNICAL FIELD

The present invention relates to a method of MBMS bearer control which can provide for bearer establishment, reconfiguration or release, and to a mobile radio communications device, and related network device, providing for such bearer control.

BACKGROUND ART

With regard to known Multimedia Broadcast Multicast Services (MBMS) features, a MBMS user service can be provided by one of a plurality of MBMS bearer services.

For example, in a Long Term Evolution (LTE) scenario an MBMS bearer service can make use of several MBMS Evolved Packet System (EPS) bearers and each of which is specific to a particular media stream, i.e. different traffic type such as Voice over IP Multimedia Subsystem (VoIMS) and realtime gaming. Such spreading of the media streams across the MBMS EPS bearers helps to achieve the required radio bearer Layer 2 Quality of Service (QoS).

Typically therefore, a streaming MBMS user service is carried on one MBMS EPS bearer for the video media stream and on another MBMS EPS bearer for the audio media stream.

Also, LTE QoS and Universal Mobile Telecommunications Service (UMTS) QoS are known to have different granularities which further provides for the spreading of the different media stream. For Example, within UMTS QoS, four different media classes exist comprising conversational, streaming, interactive and background and an MBMS streamer user service requirements can be fulfilled by way of an MBMS steaming bearer service.

With regard to LTE QoS, two classes exists comprising Guaranteed Bit Rate (GBR) and non-GBR and the MBMS streaming user service requirement can be fulfilled by way of a GBR bearer for example, for speech media, and a non-GBR bearer for example for video media.

Also, at the time of Radio Access Technology (RAT) handover to, for example, E-UTRAN for a MBMS service, it is realized that many MBMS contexts may exist. In such a scenario, the Core Network (CN) is arranged to re-establish the bearers in the target E-UTRAN system in the direction of the mobile radio communications device User Equipment (UE). Each MBMS context is mapped to one MBMS EPS bearer and on the basis of QoS mapping that can be performed by the Mobile Management Entity (MME) during the 3GPP RAT handover. Then, upon handover to the E-UTRAN, the MME can be required to re-establish the multiple ongoing bearers due to the previously established, QoS mapping.

Currently, the signaling arising between the network and the UE provides for a sequential establishment of MBMS bearer services, or indeed the MBMS EPS bearers so that the various media steams and contexts are established sequentially.

Such sequential signaling also arises during reconfiguration and release of the multiple MBMS EPS bearers.

Such known method of operation has a disadvantageous effect on MBMS service reception and also leads to potential signaling overhead in the EPS system, for example at the E-UTRAN and S1 interfaces.

DISCLOSURE OF INVENTION

The present invention seeks to provide for a method MBMS bearer control and to related mobile radio communication devices and network devices, having advantages over known such methods and devices.

According to a first aspect of the present invention there is provided a method of MBMS bearer control in a mobile radio communications network by way of Non Access Stratum (NAS) signaling, the method of including employing a NAS signal for the control of a plurality of MBMS bearers.

According to another aspect of the present invention there is provided a mobile radio communications device for operation within a mobile radio communication network and arranged to offer MBMS bearer control by way of the said NAS signaling, the device being arranged to provide a NAS signal for the control of a plurality of MBMS bearers.

According to a further aspect of the invention, there is provided a mobile radio communications network device for operation with a mobile radio communications network and arranged to offer MBMS bearer control by way of NAS signaling, the network device being arranged to receive and/or provide a NAS signal for the control of a plurality of MBMS bearers.

The invention is described further hereinafter by way of example only, with reference to the accompanying drawings in which:

BEST MODE FOR CARRYING OUT THE INVENTION

Figure 1:
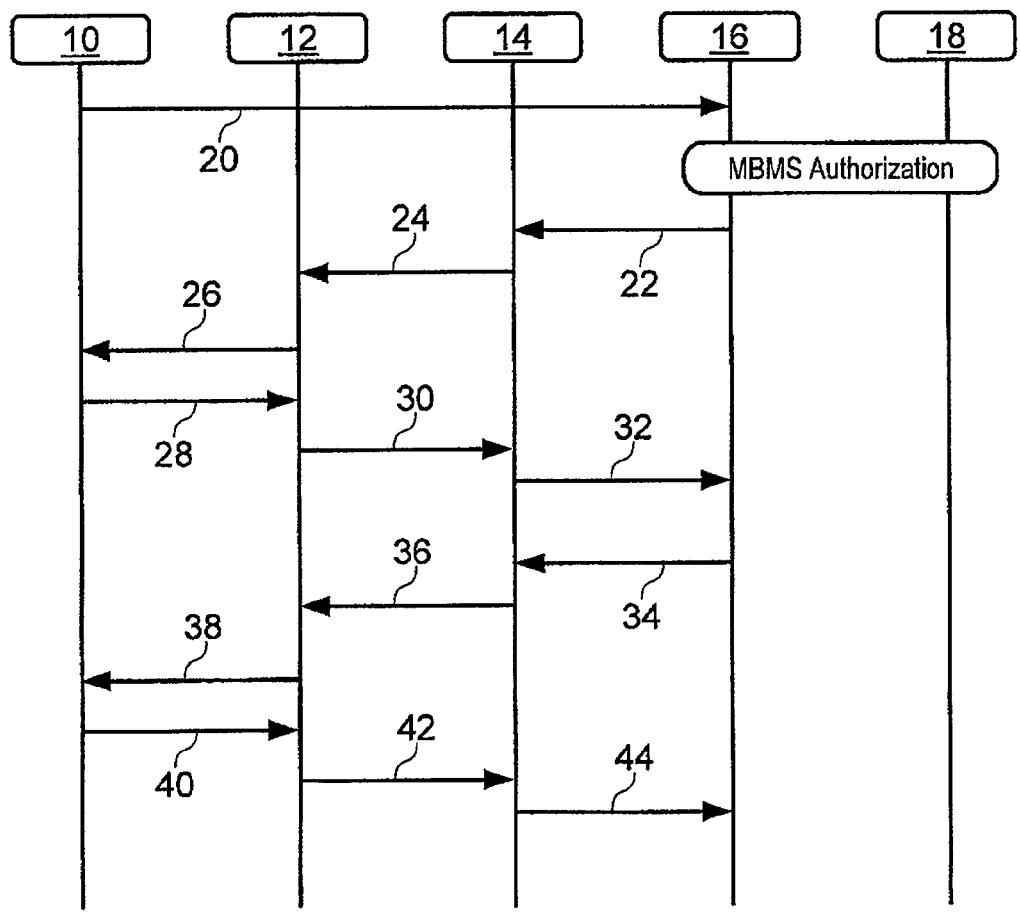
FIG. 1 is a signaling diagram relating to MBMS EPS bearer establishment in accordance with the current art.

Turning first therefore to FIG. 1 there is illustrated signaling arising within a LTE MBMS based scenario and upon MBMS multicast service activation.

The network arrangement comprises UE 10, such as a cell phone handset, a network node as a eNB 12, MME 14, a serving Gateway (GW) 16 and a broadcast/multicast service centre (BMSC) 18.

The signaling commences with an Internet Group Management Protocol (IGMP) signal 20 containing an IP Multicast address and which is delivered through the network to the serving GW 16.

MBMS operation is then authorized as indicated and this leads to a request signal 22 from the serving GW 16 to the MME 14 for one of the required media streams, for example video, in the restricted embodiment and which therefore effectively includes a Tunnel Endpoint for the video bearer.

In response, a bearer setup request signal 24 is sent from the MME 14 and the eNB 12. In further detail the bearer setup request signal 24 contains a NAS message comprising a Session Management (SM) configuration request including linked EPS bearer identification, IPMC address and reference to the first MBMS EPS bearer Traffic Flow Template (TFT).

The radio bearer setup request comprising an NAS message 26 is then effectively forwarded from the eNB 12 to the UE 10. In reply, the UE 10 issues a radio bearer setup response 28 itself comprising a NAS message including SM configuration response relating to the first MBMS EPS bearer.

Once received at the eNB 12, the setup response is then delivered as a signal 30 to the MME 14 which confirms creation of dedicated bearer by way of a response signal 32 delivered to the serving GW 16.

The bearer required for the video media stream is thus created.

A similar scenario then proceeds in relation to the further required media stream such as an audio media stream in the illustrated embodiment.

That is, a create dedicated bearer request 34 is delivered from the serving GW 16 to the MME 14 which, in turn, is delivered to the eNB 12 as a NAS message comprising SM configuration request, linked EPS bearer identification, IBMC address and a second MBMS EPS bearer with TFT.

A radio bearer setup message 38 from the eNB 12 is then received at the UE 10 and a subsequent response 40 is returned to the eNB 12 for onward delivery to the MME 14. The subsequent response 40 is transferred, as a signal 42, from the eNB 12 to the MME 14.

The MME 14 can then confirm creation of the dedicated bearer by way of a further response signal 44 delivered to the serving GW 16 and so as to confirm establishment of the second radio bearer as required for the audio media stream.

Such a process as described above, and as illustrated in FIG. 1, can continue insofar as other media stream bearer are required.

As will be appreciated from reference to FIG. 1, the establishment of the required MBS bearer is very much a sequential process and the present invention has determined that this can lead to disadvantageous service reception restrictions and signaling lading in the EPS system.

Figure 2:
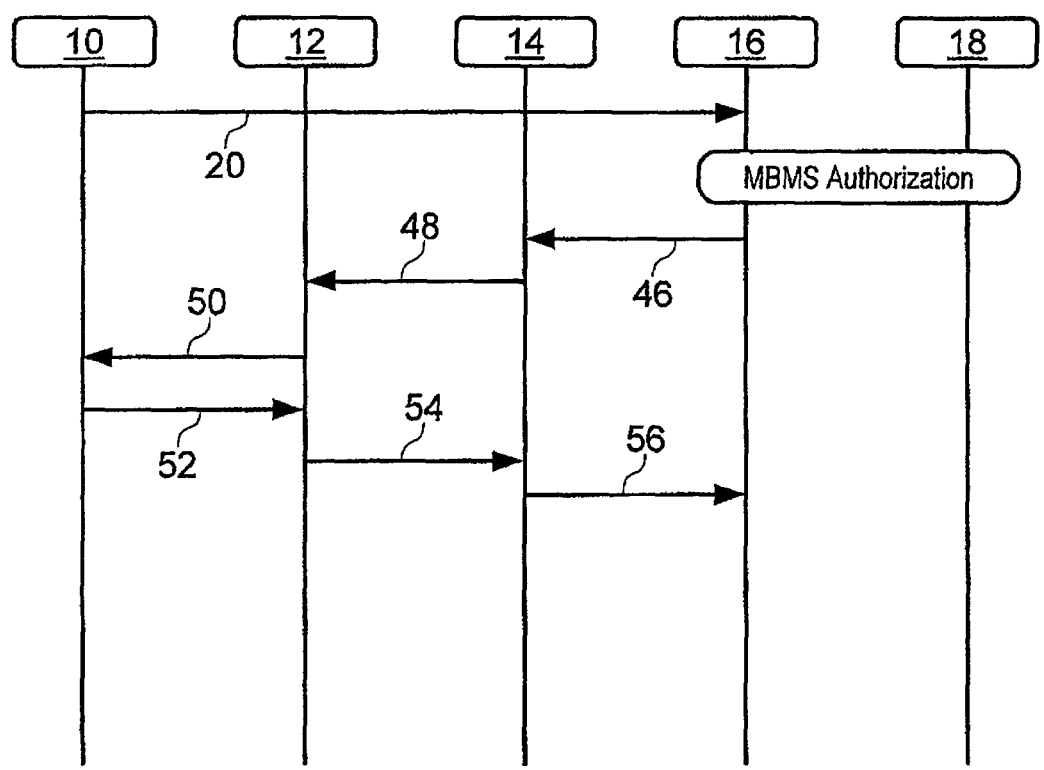
FIG. 2 is a similar signaling diagram but illustrating the signaling arising in accordance with an exemplary embodiment of the present invention.

Turning now to FIG. 2, there is illustrated signaling arising as in accordance with an exemplary embodiment of the present invention.

The signaling is again illustrated in relation to the UE 10, eNB 12, MME 14, serving GW 16 and BMSC 18 as illustrated in FIG. 1.

Also FIG. 2 illustrates a signaling arising subsequent to MBMS authorization and wherein a dedicated bearer request signal 46 is delivered from the serving GW 16 to the MME 14 and relating to all required media streams such as, for example, both video and audio streams. The signal 46 therefore comprises a list of tunnel end points for video and audio bearers.

An appropriate bearer setup request 48 is then delivered from the MME 14 to the eNB 12 and, again, relating to both the video and audio media streams.

As with the signaling illustrated in relation to FIG. 1, the bearer setup request 14 comprises a NAS SM configuration request message with linked EPS bearer ID and IPMC address data but also including multiple MBMS EPS bearer identities and TFTs each relating to one of the plurality of media streams, in this example, to bearer identities relating to the video and audio media streams.

A NAS radio bearer message 50 is then delivered from the eNB 12 to the UE 10 which in turn generates a radio bearer setup response 52 again comprising a NAS SM configuration but this time comprising a NAS SM configuration response message including MBMS EPS bearer identities for the two bearers.

The bearer setup response 54 is then delivered onwards from the eNB 12 to the MME 14 and the procedure concludes with a signal 56 from the MME to the serving GW 16 confirming creation of a dedicated bearer and comprising a list of the tunnel and points for the video and audio bearers.

Thus, as will be appreciated from the reference to FIG. 2, the establishment of the plurality of required radio bearers is effectively completed in one step and this leads to improved user experience having regard to improved MBMS serving reception, and also to reduction in the signaling load that would otherwise arise across the EPS system.

As should be appreciated, the present invention presents the novel concept of including a list of MBMS, EPS bearers within the NAS (SM) signaling messages.

Yet further, a list of MBMS EPS bearers in dedicated MBMS bearer signaling messages between the serving GW and MME entities and generally comprising the 51 interface, can be provided.

As a further feature of the invention, the MME 14 can be arranged to process the dedicated bearer request signal 56 as indicated and which includes the multiple tunnel endpoints for the MBMS EPS bearer.

Insofar as the invention allows for reestablishment of required bearers in one step as compared with the sequential steps of the prior art, user-experience can be improved from improved service reception and signaling overload within the EPS system can likewise advantageously avoided.

In particular, the said control can comprise one of the establishment reconfiguration or release of the MBMS bearer.

Of course the said NAS signaling can comprise session management signaling.

Further, the session management signal can comprise a session management control request signal, or indeed a session management control response signal.

The method can further be arranged for multiple MBMS EPS bearer control by way of the said NAS signals.

The said NAS signal can include a list of MBMS EPS bearers, and/or a list of MBMS EPS bearers in dedicated MBMS bearer signal messages sent between a serving gateway and MME entities.

Multiple MBMS bearer service control can therefore advantageously be achieved by way of the said NAS signal.

The NAS signaling can comprise session management signaling, and the device can further be arranged for multiple MBMS EPS bearer control by way of the said NAS signal.

Multiple MBMS bearer services can also be controlled by way of the said NAS signal.

The device can then also be responsive to a bearer control request signal as received from the network.

Again the NAS signaling can comprise session management signaling, and the device can be arranged for multiple MBMS EPS bearer control by way of the said NAS signal.

The device can also be arranged for multiple MBMS bearer services control by way of the said NAS signal, and/or arranged to deliver the said NAS signal to a mobile radio communications device such as that defined above.

While the invention has been particularly shown and described with reference to an exemplary embodiment thereof, the invention is not limited to this embodiment. It will be understood by those of ordinary skill in the art that various changes in form and details may be made therein without departing from the sprit and scope of the present invention as defined by the claims.

This application is based upon and claims the benefit of priority from United Kingdom patent application No. 0724315.7, filed on Dec. 13, 2007, the disclosure of which is incorporated herein it its entirety by reference.

The invention claimed is:

1. A method of Multimedia Broadcast Multicast Services (MBMS) bearer control in a mobile radio communications network by way of Non Access Stratum (NAS) signaling, the method including employing an NAS signal for the control of a plurality of MBMS bearers.

2. The method as claimed in claim 1 wherein the control comprises establishment of one of the MBMS bearers.

3. The method as claimed in claim 1, wherein the control comprises a reconfiguration of one of the MBMS bearers.

4. The method as claimed in claim 1, wherein the control comprises a release of one of the MBMS bearers.

5. The method as claimed in claim 1, wherein the NAS signaling comprises a session management signaling.

6. The method as claimed in claim 5, wherein the session management signaling comprises a session management control request signal.

7. The method as claimed in claim 5, wherein the session management signaling comprises a session management control response signal.

8. The method as claimed in claim 1 and arranged for multiple MBMS Evolved Packet System (EPS) bearer control by way of the NAS signal.

9. The method as claimed in claim 8, wherein the NAS signal includes a list of MBMS EPS bearers.

10. The method as claimed in claim 8, wherein the NAS signal includes a list of MBMS EPS bearers in dedicated MBMS bearer signal messages sent between a serving gateway and Mobile Management Entity (MME) entities.

11. The method as claimed in claim 1, and arranged for multiple MBMS bearer service control by way of a NAS signal.

12. A mobile radio communications device for operation within a mobile radio communication network and arranged to offer Multimedia Broadcast Multicast Services (MBMS) bearer control by way of Non Access Stratum (NAS) signaling, the device being arranged to provide an NAS signal for the control of a plurality of MBMS bearers.

13. The device as claimed in claim 12 and arranged such that the NAS signaling comprises session management signaling.

14. The device as claimed in claim 12 and arranged for multiple MBMS Evolved Packet System (EPS) bearer control by way of the NAS signal.

15. The device as claimed in claim 12, arranged for multiple MBMS bearer services controlled by way of the NAS signal.

16. The device as claimed in claim 12, and arranged to be responsive to a bearer control request signal as received from the mobile radio communication network.

17. A mobile radio communication network device for operation with a mobile radio communications network and arranged to offer Multimedia Broadcast Multicast Services (MBMS) bearer control by way of Non Access Stratum (NAS) signaling, the network device being arranged to receive and/or provide an NAS signal for the control of a plurality of MBMS bearers.

18. The network device as claimed in claim 17 wherein the NAS signaling comprises session management signaling.

19. The network device as claimed in claim 17 and arranged for multiple MBMS Evolved Packet System (EPS) bearer control by way of the NAS signal.

20. The network device as claimed in claim 17 and arranged for multiple MBMS bearer services control by way of the NAS signal.

21. The network device as claimed in claim 17 and arranged to deliver the NAS signal to a mobile radio communications device such as a mobile radio communications device for operation within a mobile radio communication network and arranged to offer MBMS bearer control by way of NAS signaling, the device being arranged to provide an NAS signal for the control of a plurality of MBMS bearers, and to receive a NAS signal for the control of a plurality of MBMS bearers from a Mobile Management Entity (MME) within the mobile radio communication network.

* * * * *

UNITED STATES PATENT AND TRADEMARK OFFICE
CERTIFICATE OF CORRECTION

PATENT NO.         : 8,792,404 B2                                    Page 1 of 1
APPLICATION NO.    : 12/747769
DATED              : July 29, 2014
INVENTOR(S)        : Caroline Jactat It is certified that error appears in the above-identified patent and that said Letters Patent is hereby corrected as shown below:

In the Specification

Column 4, Line 6: Delete "51" and insert -- S1 --

Signed and Sealed this
Sixth Day of January, 2015

Michelle K. Lee
*Deputy Director of the United States Patent and Trademark Office*